United States Patent
Wang et al.

(10) Patent No.: US 8,447,729 B1
(45) Date of Patent: May 21, 2013

(54) TECHNIQUES FOR PERFORMING INDICATION MANAGEMENT

(75) Inventors: Yong Wang, Westborough, MA (US);
Lorenzo Bailey, Framingham, MA (US);
Ken Kim, Worcester, MA (US);
Utkarsh Vipul, Mansfield, MA (US);
Xuan Tang, Hopkinton, MA (US);
Muhamad Djunaedi, Northborough, MA (US); Sriram Krishnan, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/928,653

(22) Filed: Dec. 15, 2010

(51) Int. Cl.
*G06F 7/00* (2006.01)

(52) U.S. Cl.
USPC .......................................... 707/634; 707/613

(58) Field of Classification Search
USPC ................................. 707/613, 634
See application file for complete search history.

(56) References Cited

U.S. PATENT DOCUMENTS

| | | | |
|---|---|---|---|
| 6,832,224 B2 * | 12/2004 | Gilmour | 1/1 |
| 2002/0064149 A1 * | 5/2002 | Elliott et al. | 370/352 |
| 2010/0093396 A1 * | 4/2010 | Roundtree | 455/558 |

* cited by examiner

*Primary Examiner* — Fazlul Quader
(74) *Attorney, Agent, or Firm* — Muirhead and Saturnelli, LLC

(57) ABSTRACT

Described are techniques for performing indication management. Registration criteria is received including information identifying a first set of data elements of a first data model about which a subscriber is registered to receive notifications. Operations are performed to a second set of data elements stored in a data store in accordance with a second data model. The second set of data elements in accordance with the second data model is mapped to a third set of data elements in accordance with the first data model. Using the first set and the third set, a first portion of the third set is determined which is identified in the first set. First processing is performed in accordance with the registration criteria and the first portion of the third set to determine notifications for a subscriber regarding data elements of the first set.

19 Claims, 11 Drawing Sheets

TECHNIQUES FOR PERFORMING INDICATION MANAGEMENT

BACKGROUND

1. Technical Field

This application relates to techniques used in connection with indication management in a system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, a subscriber may register to receive notifications regarding the occurrence of events in the system. Processing may be performed regarding the occurrence of a system event even though such processing may otherwise be omitted if there is no subscriber registered to receive notification of such an event occurrence. The foregoing may result in inefficient use of system resources which may otherwise be consumed in connection with other processing.

SUMMARY OF THE INVENTION

In accordance with one aspect of the invention is a method for performing indication management. Registration criteria is received including information identifying a first set of one or more data elements of a first data model about which a subscriber is registered to receive notifications. One or more operations are performed to a second set of one or more data elements stored in a data store in accordance with a second data model. Each of the one or more operations is an operation to modify, create or delete a data element. The second set in accordance with the second data model is mapped to a third set of one or more data elements in accordance with the first data model. Using the first set and the third set, a first portion of the third set which is identified in the first set is determined. First processing is performed in accordance with the registration criteria and the first portion of the third set to determine notifications for a subscriber regarding data elements of the first set. Data elements in the third set may be dependent upon data elements in said second set. The method may include: obtaining, from the data store, one or more current values for the first portion of data elements, said first portion including only data elements of the third set identified in the first set; and determining which of said one or more current values for the first portion of data elements have changed with respect to one or more previous values for the first portion of data elements. The one or more current values may be updated values for the first portion of data elements as a result of performing said one or more data operations. The data store may be updated in response to an occurrence of a fixed polling interval. The method may also include notifying a first indication manager regarding said one or more operations, wherein said first indication manager performs said determining a first portion and sends one or more notifications to a subscriber in accordance with said first processing. The first data model may be an object model including a plurality of objects and, for each of said plurality of objects, one or more attributes, and wherein said first set of one or more data elements may identify at least one of the plurality of objects or at least one attribute of one of said plurality of objects. The first set may identify a first object and said registration criteria may indicate to provide notification regarding a change to one or more attributes of the object. The first subscriber may be a first indication manager, and a second indication manager may subscribe to said first indication manager. The first indication manager may send a set of one or more other notifications to said second indication manager regarding said set of one or more notifications. Any of the first indication manager and the second indication manager may send a notification to a client. The registration criteria may include providing notification regarding any of deletion of an object, creation of an object, modification to an attribute of an object, and modification to any object of a class. A first data element in the first data model may be determined using a plurality of data elements from the second data model. The first data element may be an object having a plurality of attributes, a first of the plurality of attributes being determined using one or more data elements from the second model.

In accordance with another aspect of the invention is a system comprising: a framework indication manager that receives registration criteria including information identifying a first set of one or more data elements of a first data model about which a subscriber is registered to receive notifications; a client indication manager that receives notifications regarding data element changes from the framework indication manager; a data abstraction layer performing mapping operations between data elements of the first data model and a second data model, wherein one or more data elements of the first data model are dependent upon one or more data elements in the second data model; a plurality of drivers providing, in response to a polling request at a first point in time, a second set of data elements; a data store that stores the second set of data elements in accordance with the second data model and notifies the framework indication manager when an operation is performed to update one or more data elements of the data store; an update manager that generates the polling request; and an indication caching store that stores a set of values only for data elements identified in said registration criteria, said set of values being values obtained at a second point in time prior to said first point in time, wherein the framework indication manager uses the set of values to determine whether any changes have been made to said first set since said second point in time. The second point in time may correspond to when said framework indication manager performs registration processing in connection with said registration criteria. The operation to update the data store may include any of modifying an existing object in the second data model, creating a new object in the second data model, deleting an object in the second data model, and updating an attribute of an object in the second data model. The polling request may be generated in response to an occurrence of a trigger event that is any of an occurrence of a predetermined time interval, and when a client initiates an operation causing an update to one or more data elements of the first data model. The framework indication manager may only send a first notification regarding a first data element to the client indication manager if the first set identifies that a subscriber is registered to receive notifications regarding the first data element.

In accordance with another aspect of the invention is a computer readable medium comprising code stored thereon for performing indication management in a data storage system, the computer readable medium comprising code stored thereon which, when executed, performed a method comprising: receiving registration criteria including information identifying a first set of one or more data elements of a first data model about which a subscriber is registered to receive notifications regarding entities in the data storage system; receiving, from a plurality of drivers, state information describing a state of one or more entities in the data storage system; storing, in a data store, the state information in accordance with a second data model, wherein said storing includes performing one or more operations to a second set of one or more data elements included in the state information stored in the data store in accordance with the second data model, each of said one or more operations being an operation to modify, create or delete a data element; mapping said second set of one or more data elements in accordance with the second data model to a third set of one or more data elements which are in accordance with the first data model and are dependent on said second set; determining, using said first set and said third set, a portion of said third set which is identified in said first set; and performing first processing in accordance with said registration criteria and said portion of the third set to determine notifications for a subscriber regarding data elements of the first set, wherein said first processing includes identifying data elements of the portion having a current set of values which are different from previously stored values for the identified data elements. The first data model may be an object model including a plurality of objects and, for each of said plurality of objects, one or more attributes. The first set of one or more data elements may identify at least one of the plurality of objects or at least one attribute of one of said plurality of objects.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
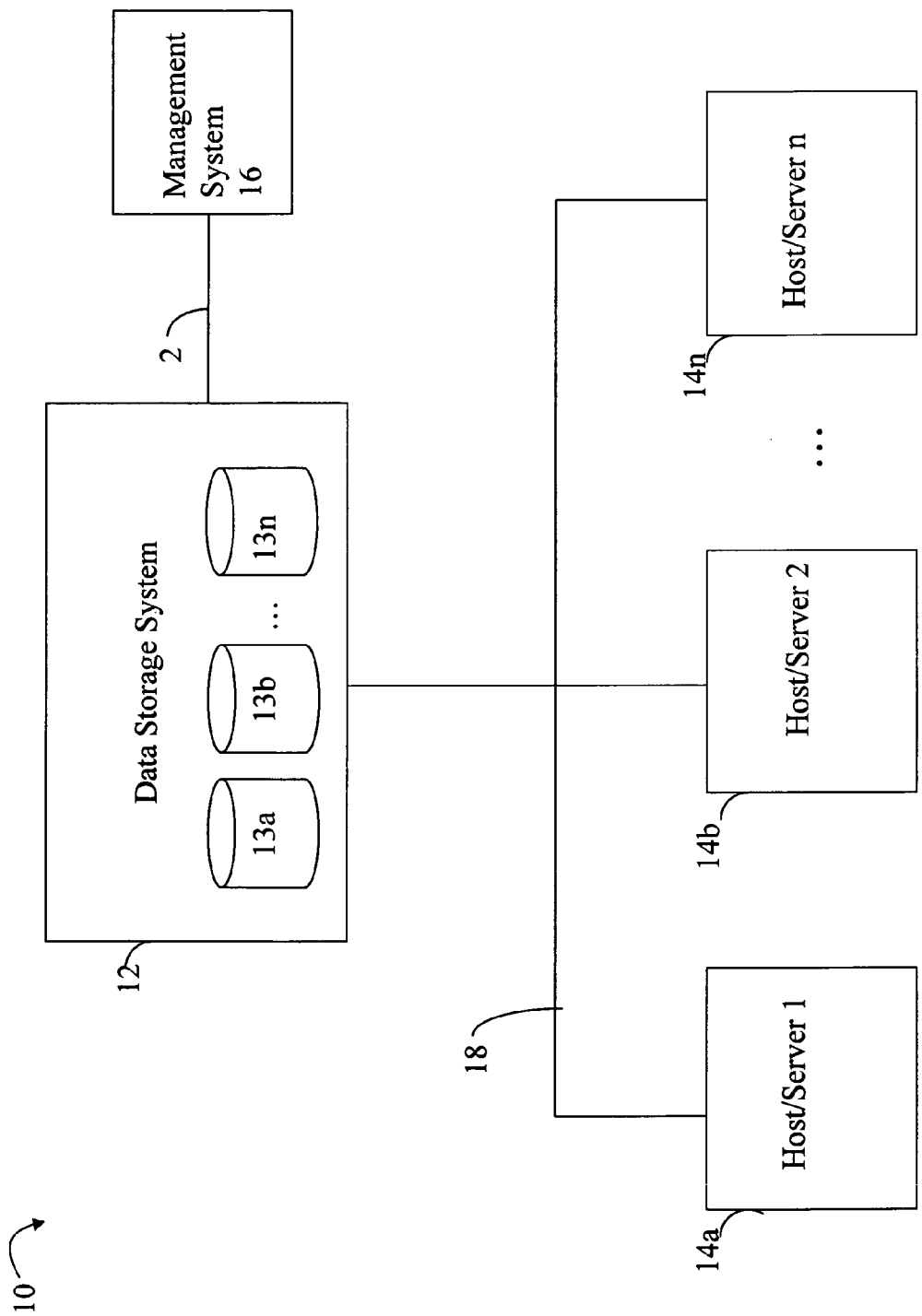
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
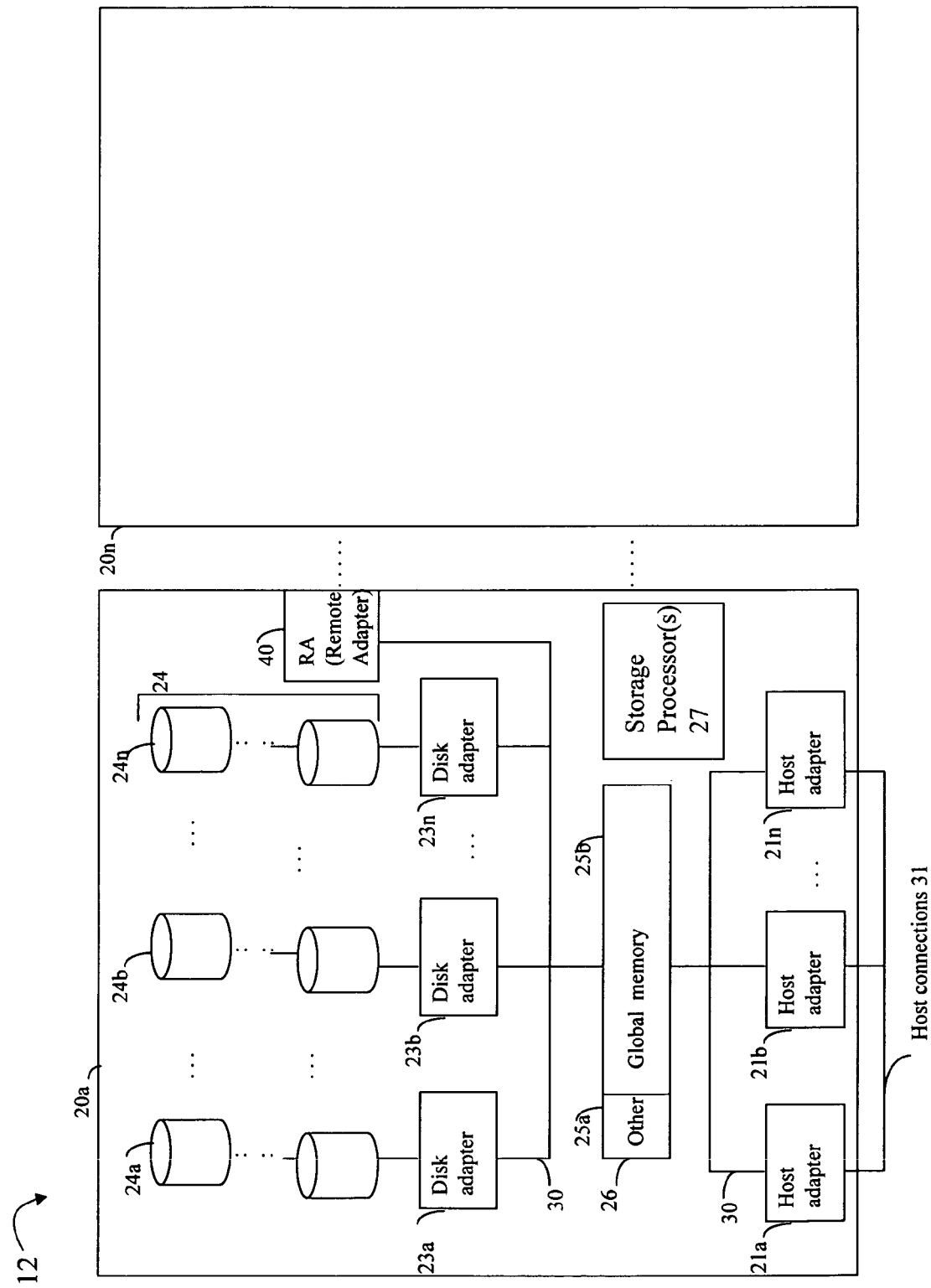
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with a data storage system, a client may register to receive notifications regarding the occurrence of one or more system events. Notification of such events may include, for example, data storage configuration changes (e.g., when a LUN is created/added or has a property thereof modified), when existing unused storage capacity is a threshold level, when a hardware or software component has a state change associated with a problem (e.g., power failure, unable to read/write to a physical or logical device), and the like. Described in following paragraphs are techniques that may be used in an embodiment in connection with indication management. The techniques herein provide for selective data processing and tracking of indications for which a client is registered. An embodiment described in following paragraphs may use an object-based model although other embodiments in accordance with techniques herein may use different data model(s). In such an embodiment using an object-based model, registration and notification may be performed with respect to objects, an attribute or property of an object, and/or a class of objects. The object may correspond to, and represent the state of, a physical or logical entity in the data storage system. For example, an object may represent a physical component such as a fan, power supply, port, or physical storage device. The physical component may be characterized by state information represented as properties or attributes of an object. For example, an object corresponding to a physical storage device may have attributes representing the total available storage capacity, an amount of unused or free storage capacity, physical device characteristics, and the like. An object may also represent a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

In one embodiment in accordance with techniques herein, the object model may be in accordance with a standard such as the CIM (Common Information Model) standard. Clients may register to receive indication notifications regarding any one or more type of events regarding the objects. A client may register to receive notification regarding different levels and/or categories of changes. For example, a client may register to receive notifications regarding changes to any object, changes to one or more specified objects (e.g., changes to any attribute of the specified objects), changes to one or more specified attributes of an object, when any new object is created, when any object is deleted, and the like. A client may also register to receive class-level indications such as with respect to a class of objects. For example, a client may register to receive notification when a new object in a specified class is created, when an object in a specified class is deleted, when there is any change to an attribute of an object of a specified class, and the like. The foregoing, as well as other criteria, may be used in connection with client subscriptions specified during a registration process Client registration criteria may also include, for example, filtering criteria such as may be used to specify constants, expressions, and other data values when generating an alert notification. An alert notification may, for example, provide notification when a particular object attribute is more than a specified threshold. An example may be used to specify an alert conditional expression included in filtering criteria. For example, the filtering criteria may be "OBJ1. ATT1>THRESHOLD1" representing the condition when attribute ATT1 of object OBJ1 is more than a value represented by THRESHOLD1, wherein THRESHOLD1 may be a constant, expression of one or more other parameters and/or constants, and the like. It should be noted that although examples in following paragraphs and figures may refer to particular types of notifications and registration criteria, the techniques here are more generally applicable for use with any suitable registration criteria as well as other variations appreciated by those skilled in the art.

In one embodiment in accordance with techniques herein, the registration criteria and clients may use a first data model that is an object model as described above. As will be described in more detail in following paragraphs, information regarding the state of entities in the data storage system may be initially obtained and described in accordance with a second data model different from the first data model. Using techniques herein, one or more data elements of the first data model may be mapped to corresponding one or more data elements in the second data model, and vice versa.

In an implementation which does not use the techniques herein, processing may be performed for tracking and determining changes to objects, attributes, and/or classes of objects even if there is no client registered to receive notifications regarding such objects, attributes and/or classes. In contrast, an embodiment in accordance with techniques herein may be characterized as performing customized indication management where tracking and management is performed only with respect to the data elements for which indications have been registered. The foregoing provides for more efficient use of data storage system resources, such as CPU time and memory consumption.

Figure 3:
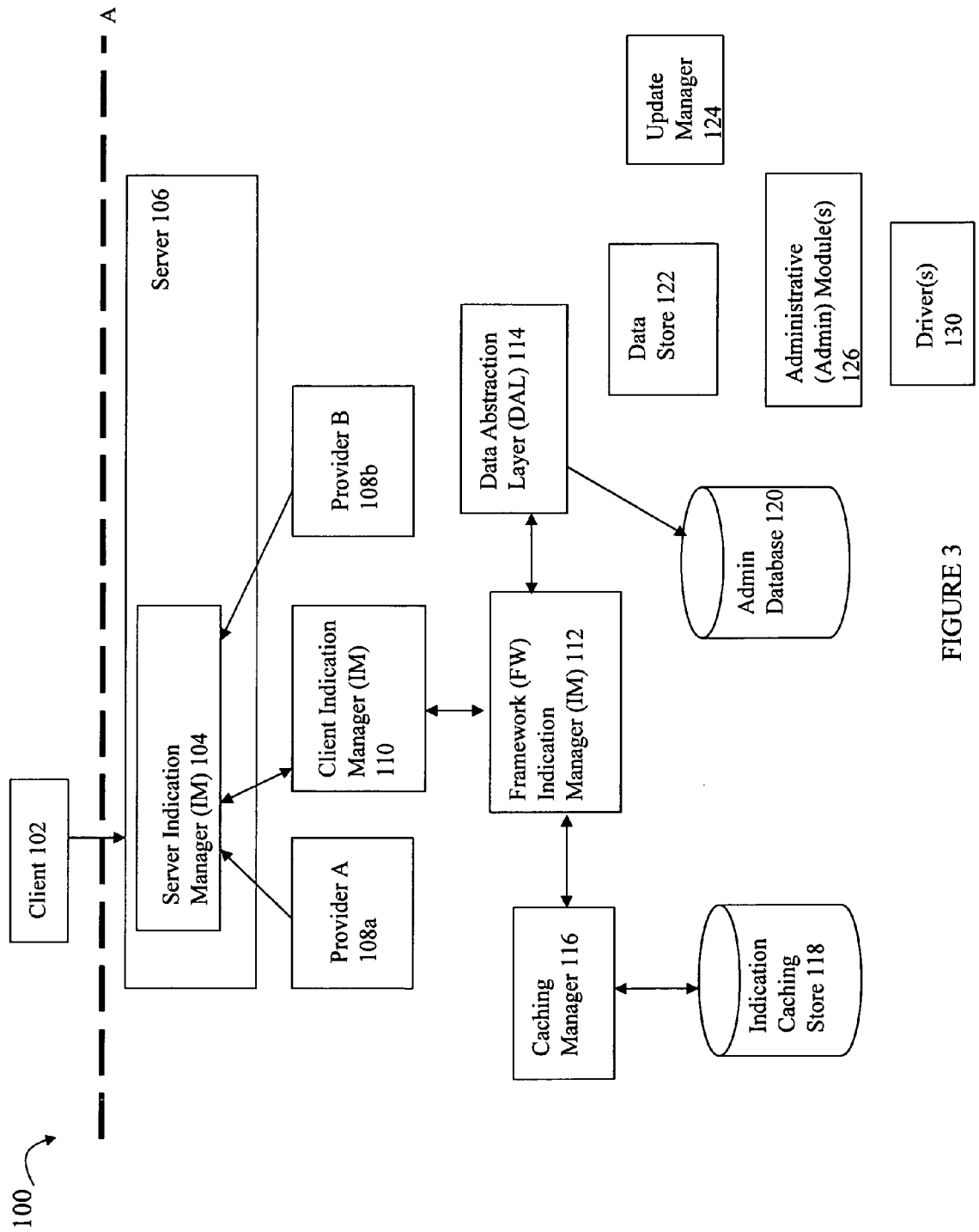
FIG. 3 is an example illustrating data flow and communications between components in an embodiment in accordance with techniques herein when performing indication registration processing.

Referring to FIG. 3, shown is an example of a components that may be included in an embodiment in accordance with techniques herein. The example 100 includes components of the data storage system and an external client 102 used to illustrate how indication registration may be performed. As described in more detail below, the arrows indicate the data flow and communications that may be performed with respect to the illustrated components in connection with indication registration in an embodiment in accordance with techniques herein. The dashed line denoted as A may represent a partitioning of components included in the data storage system (e.g., those below the dashed line A) and those which are external to the data storage system (e.g., those above the dashed line A). The example 100 includes a remote or external client 102, server 106, server indication manager (IM) 104, providers 108a, 108b, client IM 110, framework IM 112, data abstraction layer (DAL) 114, caching manager 116, indication caching store 118, admin (administrative) database 120, data store 122, update manager 124, admin software module(s) 126, and driver(s) 130. A client, such as external or remote client 102, may register with the server IM 104 to receive notifications with respect to events in the represented data storage system. Providers 108a, 108b may also register as a data storage system internal clients to receive notifications by communicating with server IM 104. In connection with client registration, each client may specify registration criteria, such as described elsewhere herein in more detail, identifying the objects, attributes, and/or classes and types of operations on objects and/or classes (e.g., creation, deletion, changes or modifications) about which the client is to be notified. As part of external client registration, such registration criteria may be transmitted from the external client 102 to the server IM 104 and then to the client IM 110. As part of internal client registration, such registration criteria may be similarly transmitted from the internal clients, such as providers 108a, 108b, to the server IM 104 and then to the client IM 110. The client IM 110 may then further communicate client registration criteria, along with possibly other information, to the FWIM 112. In one aspect, client 102 and providers 108a and 108b are registered subscribers of the server IM 104. Furthermore, server IM 104 may be characterized as a registered subscriber of client IM 110 and client IM 110 may be characterized as a registered subscriber of FWIM 112. The foregoing description regarding server IM 104, client IM 110 and FWIM 112 may be characterized as describing a hierarchy of IMs that may be included in an embodiment in accordance with techniques herein. More generally, an embodiment may include any number of one or more levels of components such as IMs, providers and/or external clients. In this exemplary hierarchy, each IM included in the hierarchy may have any number of subscribers. To further illustrate, a provider, IM, or other "client" may register directly with the client IM. For example, provider 108a or another software component may register directly with the client IM 110 and/or server IM 104. In connection with the foregoing subscription hierarchy, appropriate registration information may be maintained at, and also propagated to, the different levels in the hierarchy to enable proper notification. For example, the external or remote client registration information from client 102 may be propagated to the FWIM 112 along with other information from other direct or indirect subscribers of FWIM 112.

The FWIM 112 may maintain a list of registration criteria for use with techniques herein where the list includes information representing what content, such as data elements, in the object model is monitored in connection with determining whether to send notifications to registered subscriber(s). The list of registration criteria may identify the objects and/or attributes that are registered. More generally, the object model may be characterized as a client object model used by clients of the indication management described herein.

As described elsewhere herein in more detail, data describing a state of components of the data storage system may be stored in the admin database 120. Element 120 may represent a database or other data container in which data is stored in accordance with a second data model different from the client object model. The admin database 120 may be stored in a form such as in accordance with a database model. The DAL 114 may be used in connection with mapping data elements from the client object model to the database model, and vice-versa. The FWIM 112 may call the DAL 114 to obtain current values for the registered data elements identified in the registration criteria. The FWIM 112 only obtains values of the attributes, objects and/or classes specified in the registration criteria. The FWIM 112 may pass to the DAL 114 as input parameters the one or more attributes and objects specified in the registration criteria in accordance with the client object model. The DAL 114 may use mapping information to determine one or more data elements of the admin database 120 in accordance with the database model which correspond to those of the input parameters. The DAL 114 may obtain values for the corresponding data elements in accordance with the database model from admin database 120 and return the values to the FWIM 112. The FWIM 112 may then communicate with the caching manager 116 to store the values in the indication caching store 118. The indication caching store 118 may include values only for those data elements identified in the registration criteria (e.g., only for registered data elements of the client object data model). The caching store 118 may generally be any type of data container (e.g., file, directory, database and the like) suitable for storing the values of the registered data elements. As will be described in more detail below, data of the indication caching store 118 may be used to determine whether a data element value has changed.

Use of the data store 122, update manager 124, admin module 126 and drivers 130 are described in more detail elsewhere herein. Generally, the drivers 130 collect information which is reported through a call stack of software layers including the admin module(s) 126 and data store 122, where such information may then be stored in the admin database 120.

Figure 4:
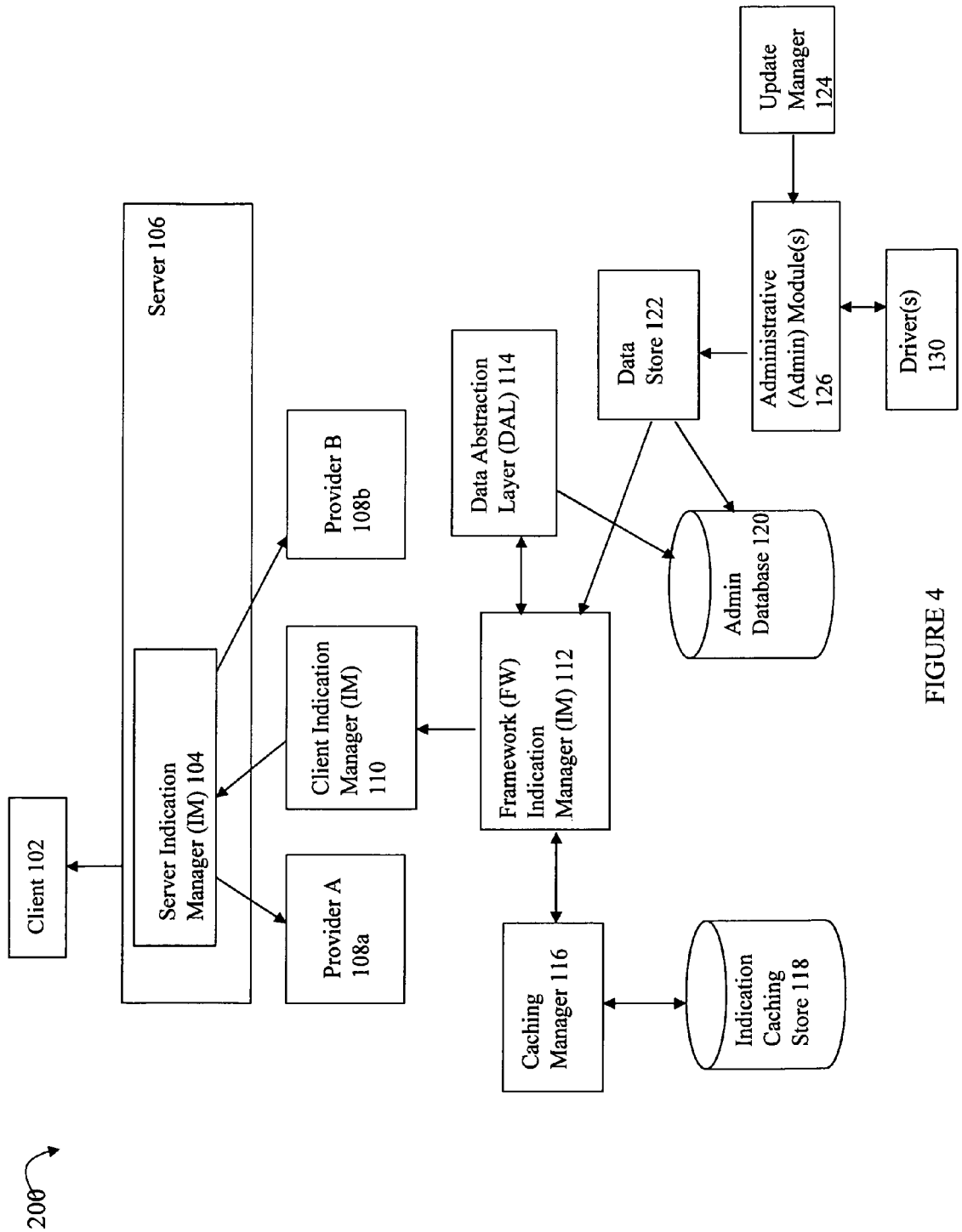
FIG. 4 is an example illustrating data flow and communications between components in an embodiment in accordance with techniques herein when performing indication notification processing.

Referring to FIG. 4, shown is an example of the components of FIG. 3 annotated to indicate data flow and communication between components illustrating how indication notification may be performed in an embodiment in accordance with techniques herein. The update manager 124 may generate a request to poll the drivers 130 for state information. The update manager 124 may generate a polling request in response to an occurrence of a trigger event. The trigger event may be an occurrence of a defined polling interval, as well as an occurrence of one or more other defined events. The update manager 124 may issue the request to the admin modules 126 which then obtain the state information from the drivers 130. The admin modules 126 then communicate the state information to the data store 120. The data store 120 may process the received state information and populate the admin database 120 by performing database operations such as by issuing appropriate database commands including update, insert and/or delete database commands. The admin modules 126 may receive data in the form of object in accordance with an administrative data model which may then be further mapped into the database model. The database model may include data stored in one or more database tables where such tables include one or more rows of data elements. The data store 122 may perform database operations which update the appropriate database tables, and portions thereof, in accordance with the received state information from the drivers 130. The data store 122 may the determine which one or more rows of the database tables have been modified as a result of the performing the database operations to store the received state information. In one embodiment, the data store 122 may use a database transaction log to track and determine the database table row-level changes and notify the FWIM 112 regarding such changes. The data store 122 may provide the FWIM 112 with a database (DB) key or row identifier (ID) used to identify each row of a database table that has been modified as a result of performing the database operations.

In connection with performing the database operations such as update, insert and/or delete, it should be noted that the net or end result of these operations may not cause a change to one or more data values stored in the database tables of the admin database 120. For example, an update command may rewrite a same data value to a row of a database table. As another example, performing a series of database table insertions and deletion commands may result in no net changes to the database table. For example, a first row may be added and then the same row may be deleted. As a result, a change to a data value currently stored in the admin database 120 may not detectable solely based on the database table rows for which update, delete and/or insert operations have been performed. As a first step, an embodiment may identify the database table rows for which an update, delete and/or insert operation have been performed. As a second step, an embodiment may further examine data values of the identified database table rows to determine whether such rows contain any entries having changed or different data values. To this end, data values have been stored prior to indication notification processing (e.g., stored as part of indication registration processing) in the indication caching store 118 for registered data elements identified by the registration criteria. Such data values of the indication caching store 118 may now be retrieved and used in connection with techniques herein with indication notification processing to determine, for a data element, whether the value of the data element has changed or is different from a previously stored value for the data element (e.g., value of the data element prior to updating the admin database with the current state information obtained in response to a polling request as described below).

As noted above, the FWIM 112 is notified by the data store 122 as to database table rows affected by update, insert and/or delete operations. The data store 122 may send a DB key or row ID to the FWIM 112 for each such row. In turn, the FWIM 112 may call the DAL 114 supplying the row ID as an input parameter. In response, the DAL 114 may return a list of one or more data elements in the client object model dependent on data elements of the row ID. More specifically, the DAL 114 may return a list of objects in the client object model where each object in the list includes an attribute or property dependent on a data element of the database object model identified by the row ID. As described in further detail in following paragraphs, the DAL 114 may use the row ID for a database table row to identify one or more data elements of the database model included in the row. The DAL 114 may then map the one or more identified data elements of the database model to one or more other data elements of the client object model. Each of the data elements in the client object model determined by the mapping step is dependent upon one or more of the identified data elements of the database model in the row. The mapping step may identify, for example, one or more object attributes of the client object model which are determined or otherwise dependent on the one or more data elements of the row. From this, the DAL 114 may determine and return a list of the objects of the client object model, each such object having one or more attributes dependent a data element of the database model which is also included in the row. It should be noted that in an embodiment providing support for class level indications, the class of each object may also be identified and returned by DAL to the FWIM 112.

The FWIM 112 then processes the returned list of data elements (e.g., returned object list) from DAL 114 against, or with respect to, the registration criteria to identify data elements of the registration criteria which are also identified in the returned list of data elements (e.g., determine the intersection of data elements with respect to the registration criteria and the returned list of data elements). In particular, the FWIM 112 may compare the objects of the returned object list to identify, for example, objects of the registration criteria matching objects in the returned object list, an attribute of an object in the registration criteria where the object matches an object in the returned object list, and the like. From such processing, the FWIM 112 may identify, for example, a list of object attributes where each such attribute is identified by the registration criteria and also by the returned object list. It should be noted that an attribute may be identified directly or explicitly in the registration criteria, or may be identified indirectly by identifying the object including the attribute. In a similar manner, an object may be identified directly or explicitly in the registration criteria, or may be identified indirectly by identifying a class including the object (e.g. register for one or more types of indications—such as object creation, deletion and/or modification—for a particular class of objects).

The identified list of object attributes may represent those attributes which are registered and also those for which a data value change may have occurred. In other words, a database operation was performed which may have (e.g., potentially) resulted in a change to the data value of the attribute. In order to determine if the current data value of the attribute as stored in the admin database 120 has changed with respect to the attributes previous data value, the FWIM requests from DAL current data values of the attributes, requests from the caching manager 116 and the indication caching store 118 previous data values of the attributes, and then compares corresponding ones of the current and previous data values to determine any changes or more generally differences between corresponding previous and current data values. As will be appreciated by those skilled in the art, an attribute which has a current value but no previous value from 118 is a newly created attribute, such as that of a newly created object, an attribute which has no current value but has a previous value from 118 is a deleted attribute, such as of a deleted object, and an attribute which has a current value and a previous value from 118 may be characterized as a modified attribute of an existing object having a value which may have been changed to a different value as result of the modification or update.

Based on the foregoing, the FWIM 112 may determine, for example, those attributes and/or objects that have been modified, newly created objects, and deleted objects. From the foregoing, class-level indications may also be determined as needed in accordance with the registration criteria. Additionally, based on the foregoing, appropriate notifications may be formed and transmitted from FWIM 112 to client IM 110, and from client IM 110 to server IM 104, and from server IM 104 to providers 108*a*, 108*b* and/or client 102.

It should be noted that the information included in a notification may vary with embodiment. For example, in an embodiment in accordance with an client object model standard, the standard may specify the information included in the different indication notifications. For example, when a client is registered to receive an indication notification when an object has changed, a notification is transmitted if any attribute value of the object has changed. The notification may be required by the standard to identify all current attribute values of the object even if only a single attribute values has changed.

Figure 5:
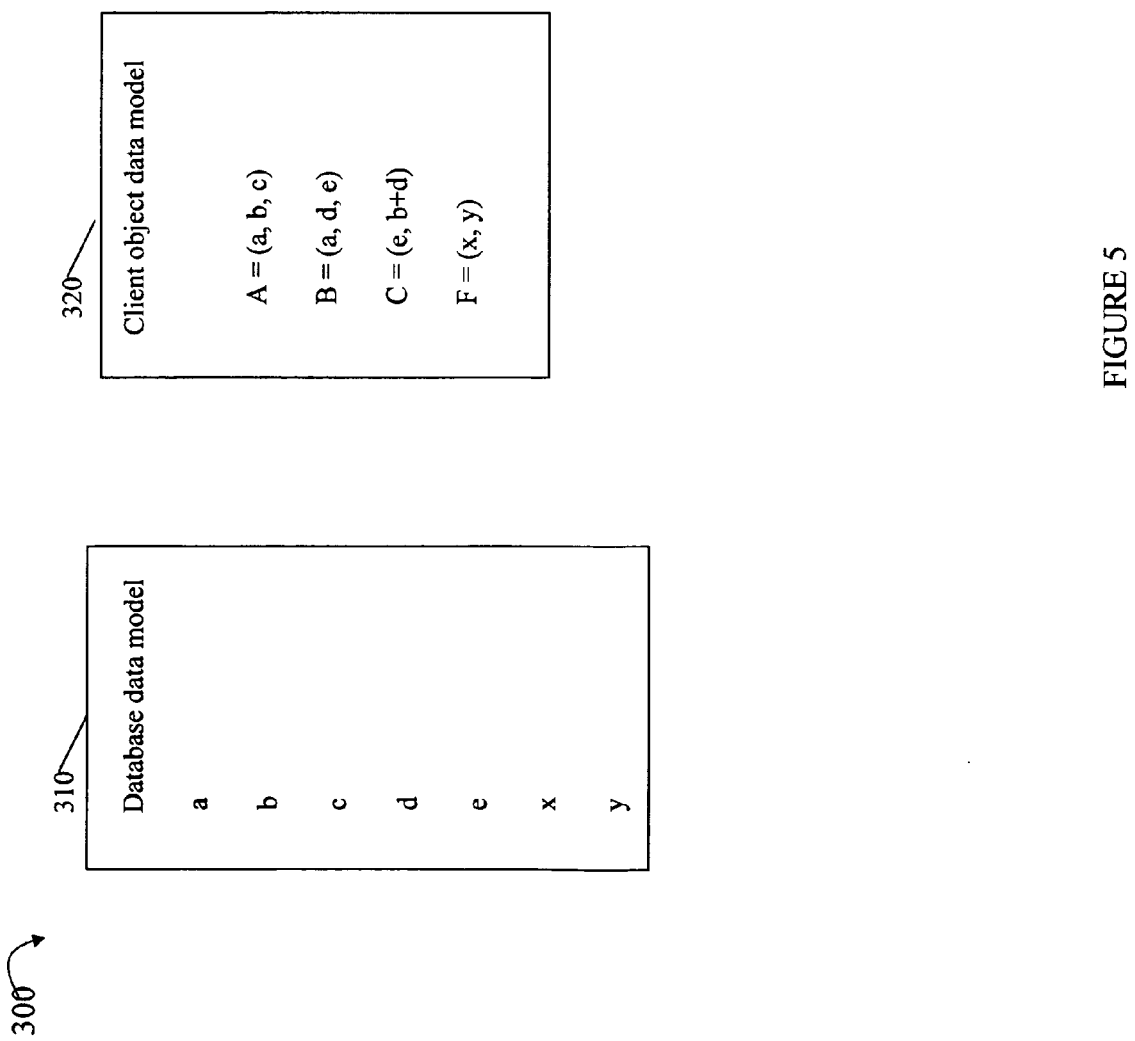
FIG. 5 is an example representation of two data models that may be used in an embodiment in accordance with techniques herein.

Referring to FIG. 5, shown is an example representation of data models and mapping information that may be used in connection with techniques herein. The example 300 includes a database data model representation 310 and a client object model representation 320. Element 310 identifies data elements included in the database data model. Element 320 identifies data elements of the client object data model. In the example 300 and in connection with other figures and paragraphs herein, lower case alphabetic characters represent data elements of the database data model (e.g., denoted "a", "b", "c", and the like, and upper case alphabetic characters represent data elements of the client object data model (e.g., denoted "A", "B", "C", and the like). Each data element of the client object data model 320 may be dependent upon one or more data elements of the database data model 310. For example, object A of 320 may represent an object including 3 attributes having values determined from (or dependent upon), respectively, database model data elements a, b, and c. As another example, object C of 320 may represent an object including 2 attributes having a first attribute value determined from database model data element e and a second attribute value determined from, or dependent on, database data elements b and d (e.g. denoted b+d).

Figure 6:
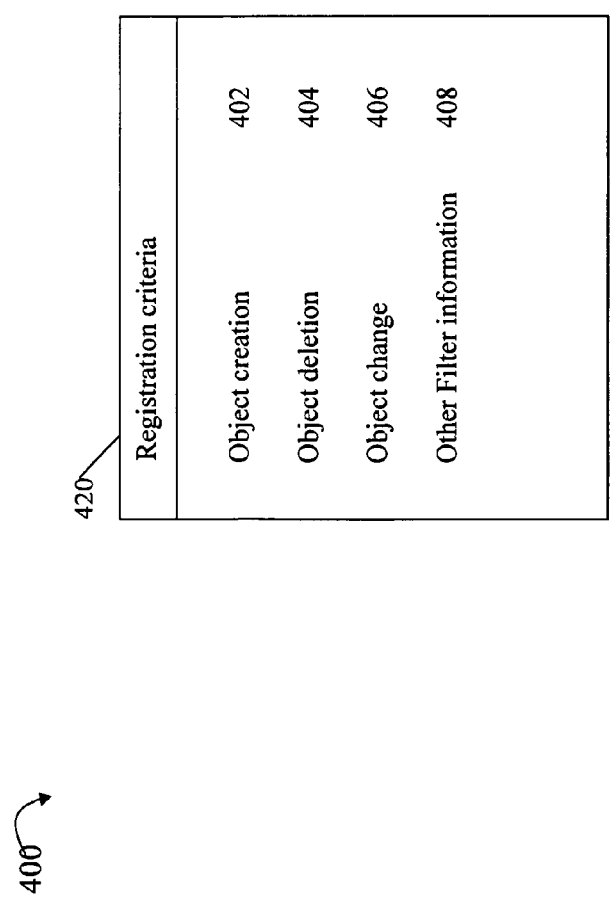
FIG. 6 is an example representation of registration criteria that may be used in an embodiment in accordance with techniques herein.

Referring to FIG. 6, shown is an example representation of information that may be stored in connection with registration criteria in an embodiment in accordance with techniques herein. The example 400 includes a table of information 420 that may collectively represent all registered data elements and other registration criteria such as may be used by the FWIM or other component performing indication notification processing. In one embodiment, the criteria 420 may identify registered data elements of the client object data model in connection with other information used in determining whether to generate an indication notification for the registered data elements. For example, the criteria 420 may identify an object, attribute, and/or class and particular operations with respect to the foregoing. The criteria may identify, for example, whether notifications are generated when an object is created 402 (e.g., criteria may also specify to generate an indication notification when any object is created, or when an object of a specified class is created), when an object is deleted 404 (e.g., criteria may also specify to generate an indication notification when any object is deleted, when a named object is deleted, or when an object of a specified class is deleted), when an object is changed 406 (e.g., criteria may also specify to generate an indication notification when any attribute of any object has a changed data value, when any attribute of a named object has a changed data value, when one or more specified attributes of a named object are changed, or when any object of a specified class has an attribute value changed), and possibly other filter information 410. The other filter information 410 may generally represent, for example, the threshold (e.g. as a constant or a more general expression with possible mathematical and/or logical operations) and condition (e.g., greater than, less than, equal to, and the other comparatives) as described above in connection with filtering criteria. In an embodiment, the registered data elements of the client object model included in the criteria 420 may take any one or more suitable forms such as, for example, a list or other data structure of objects, attributes and/or classes.

Figure 7:
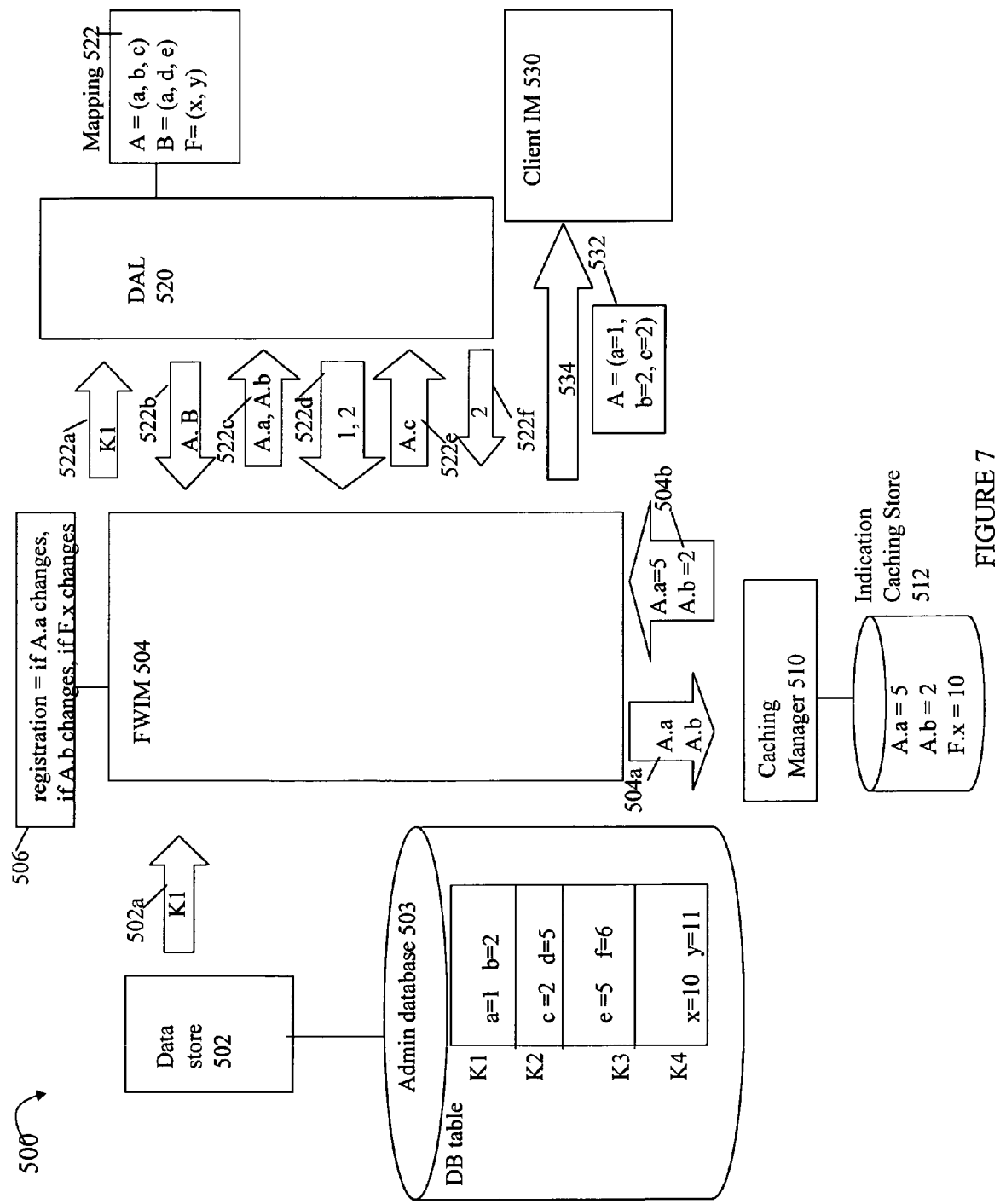
FIG. 7 is an example illustrating additional details of data flow and communications between components in an embodiment in accordance with techniques herein when performing indication notification processing.

Referring to FIG. 7, shown is a more detailed example of indication notification processing that may be performed in an embodiment in accordance with techniques herein. The example 500 includes components identified and described in previous paragraphs and figures with similar names. The example 500 includes the data store 502, admin database 503, FWIM 504, DAL 520, client IM 530, caching manager 510, and indication caching store 512 as described in connection with FIGS. 3 and 4.

As described above as a result of performing registration processing, the registration criteria 506 may identify registered data elements of the client object data model and the indication caching store 512 may be selectively populated to include values of the registered data elements at registration time.

The DB table of the admin database 503 may represent a DB table of 4 rows having corresponding row IDS K1, K2, K3 and K4. Row K1 includes database data model elements a, b having respective current values of 1 and 2. Row K2 includes database data model elements c, d having respective current values of 2 and 5. Row K3 includes database data model elements e, f having respective current values of 5 and 6. Row K4 includes database data model elements x, y having respective current values of 10 and 11. The data in 503 may represent the state of the admin database after performing processing to update the database with state information obtained from drivers in response to a polling request. The data store 502 may determine database table row-level modifications where a row is considered modified if it has been subject to a database update, insertion, or deletion operation to store data obtained in response to the polling request. In this example, let "a" of row ID K1 be changed from 5 (previous value) to 1 (current value as currently stored in 503). Data store 502 determines the changed row ID K1 and sends a message 502a to FWIM 504 identifying the changed row ID.

FWIM 504 issues a request to DAL 520 as represented by 522a which includes the change row ID K1. The request 522a is requesting a list of client object model data elements dependent on the data elements of the database model which are included in row ID K1. DAL 520 first determines, such as by communicating with the admin database 503 (not illustrated for simplicity in the figure), which database data elements are included in the row K1. In this example, a and b are identified. DAL 520 determines the dependent data elements of the client object model using a mapping 522 which maps data elements of the database model to corresponding data elements of the client object model. For example, based on 522, A and B are dependent on data element a, and A is dependent on data element b. In response, DAL 520 returns 522b a list of objects identifying A and B. FWIM 504 processes the returned list of objects A, B against, or with respect to, registration criteria 506. Element 506 identifies that A.a (object A, attribute a), A.b (object A, attribute b) and F.x (object F, attribute x) are registered data elements of the client object data model for which indication notifications may be sent. FWIM 504 determines what data elements of the client object model identified by the returned object list are also identified by (e.g., intersect or overlap with) the registration criteria 506. In this example, the returned object list 522b=A, B may indirectly identify all attributes of object A and all attributes of object B. The intersection of the foregoing may be A.a and A.b. FWIM 504 may issue a request 522c to the DAL 520 to obtain current values for the attributes A.a and A.b. Using mapping information, the DAL 520 may determine the corresponding database data elements for the requested client model data elements A.a and A.b and retrieve (not illustrated for simplicity in the figure) their current values, respectively, 1 and 2, from the admin database 503. The current values of 1 and 2 are returned 522d to the FWIM 504. The FWIM 504 also requests 504a previous values for the data elements A.a and A.b as cached in the indication caching store 512. FWIM 504 receives 504b previous data values for the data elements A.a=5 and A.b=2. The FWIM 504 then compares corresponding ones of the previous and current data values for each of the data elements A.a and A.b to determine which one or more data elements have changed data values (e.g., A.a has a previous value=5 and current value=1; A.b has a previous value=2 and a current value=2). In this example, FWIM 504 determines that only A.a has a changed data value and constructs an appropriate notification for transmission. In one embodiment such as in accordance with a standard requirement as described herein, the notification may be required to include all current attributes of the object A. In this example, the FWIM 504 has already obtained current data values for A.a and A.b and may issue request 522e to DAL 520 to obtain from the admin database 503 (not illustrated for simplicity of the figure) the remaining attribute A.c. The current value for A.c=2 is returned 522f to the FWIM 504.

The notification generated as a result of the changed attribute A.a is represented as element 532 which may include current values for all attributes of A along with possibly other information indicating which attribute has changed. The notification 532 may be sent 534 to the client IM 530. As described above and not illustrated in FIG. 7 for simplicity of the figure, the client IM 530 may accordingly send the notification to the server IM 104 which, in turn, sends the notification to its appropriate subscriber(s) (e.g., any of the providers 108a, 108b and client 102).

The indication caching store 510 may be accordingly updated with revised data values for the registered data elements in preparing for processing a next set of returned polling data.

The foregoing describes selective data tracking and processing for only those data elements identified in the registration criteria in accordance with those data elements which have changed values. The indication caching store 512 is selectively populated with only those values for registered data elements of the client object model identified in the registration criteria. Various requests and responses between components of the system, such as between FWIM 504 and DAL 520, are performed in an efficient manner with respect to limited sets of data elements.

Figure 8:
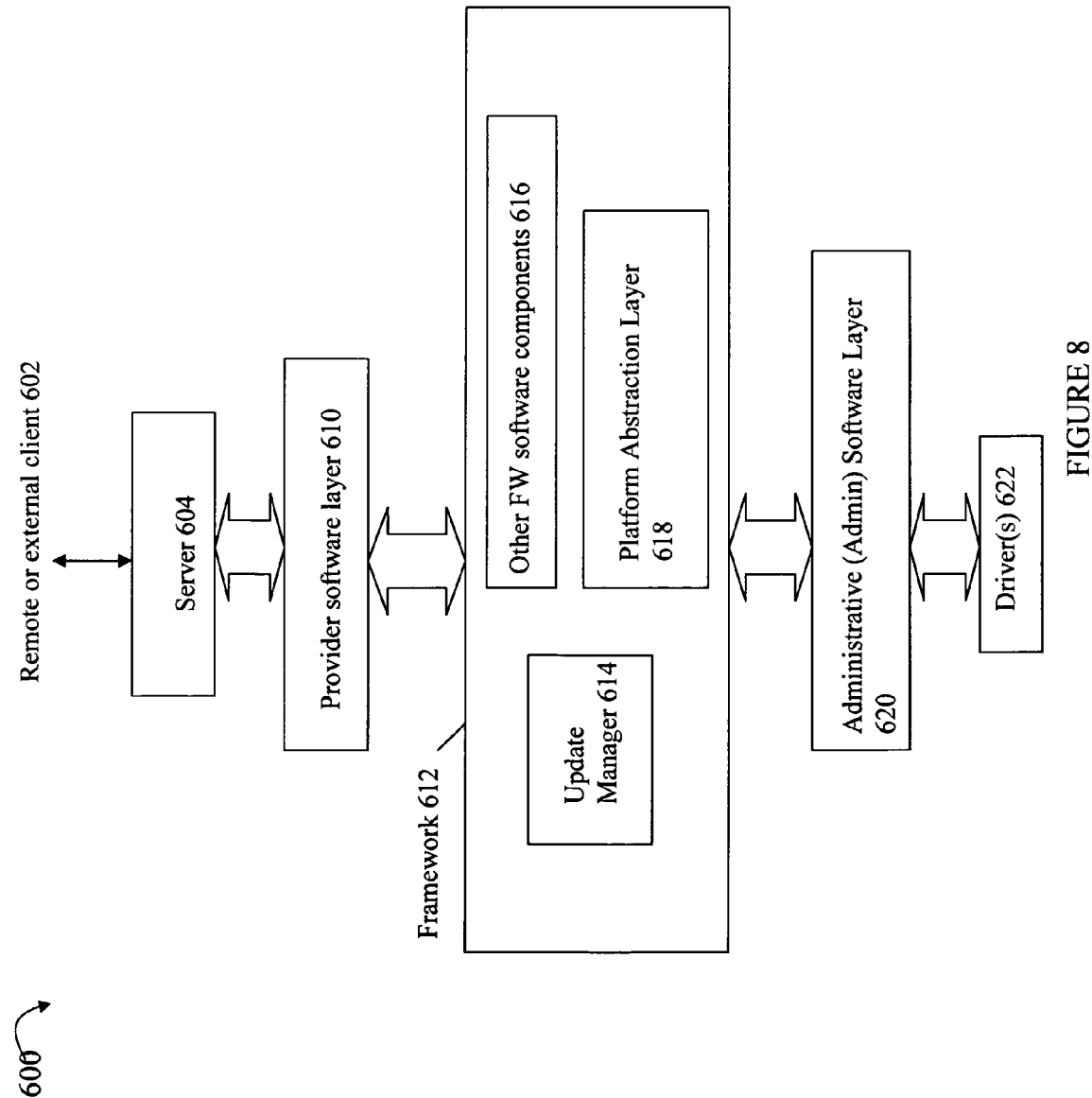
FIG. 8 is another representation of components that may be included in an embodiment in accordance with techniques herein.

Referring to FIG. 8, shown is another representation of different components that may be used in connection with techniques herein. The example 600 provides another alternative representation including components described in FIGS. 3 and 4. The client 602 may be remote or external with respect to the data storage system which includes server 604, provider software layer 610, framework 612, admin software layer 620 and driver(s) 622. With reference to FIGS. 3 and 4, elements 604, 614, 620 and 622 are respectively analogous to elements 106, 124, 126, and 130. Provider software layer 610 includes, for example, providers 108a, 108b of FIGS. 3 and 4. Framework (FW) 612 may include the update manager 614, a platform abstraction layer (PAL) 618 and other FW software components 616. The PAL 618 may serve as an interface for communications between the FW 612 and the admin layer 620. The element 616 may collectively represent one or more components described in FIGS. 3 and 4 such as, for example, 110, 112, 114, 116, 118, 120, and 122.

Figure 9:
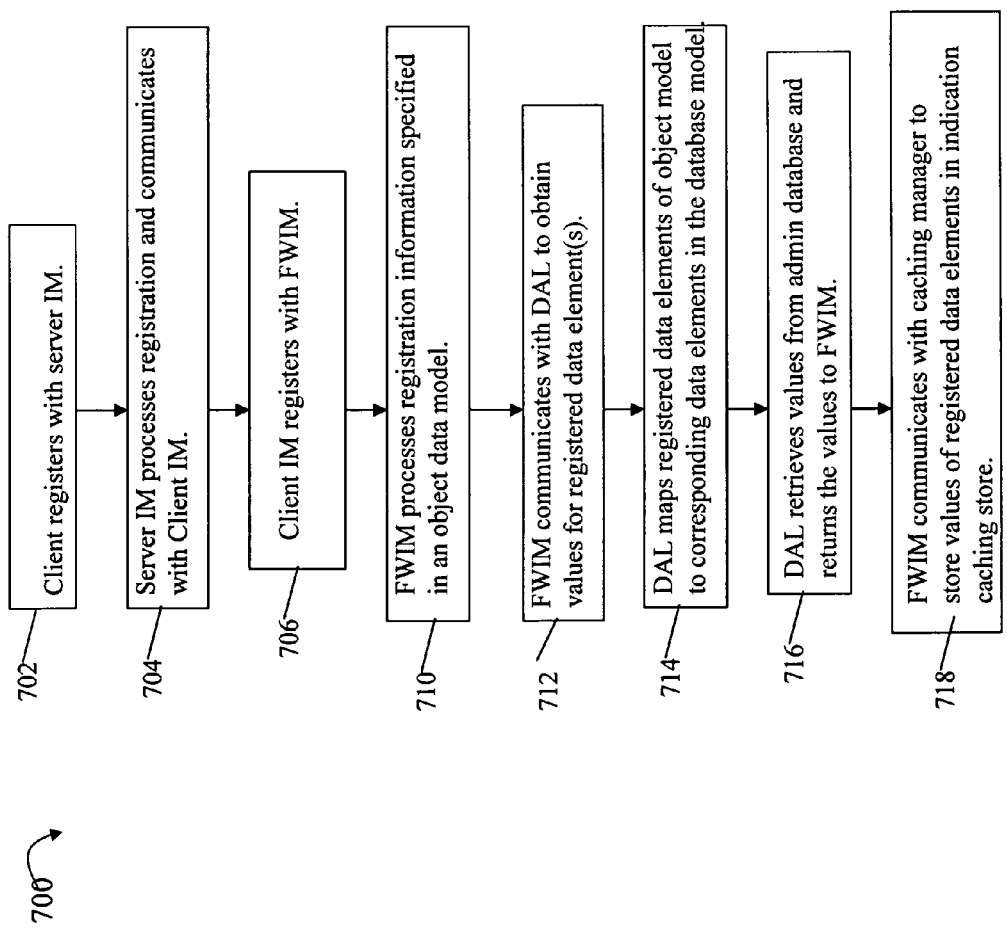
FIGS. 9, 10 and 11 are flowcharts of processing steps that may be performed in an embodiment in accordance with techniques herein.
Figure 10:
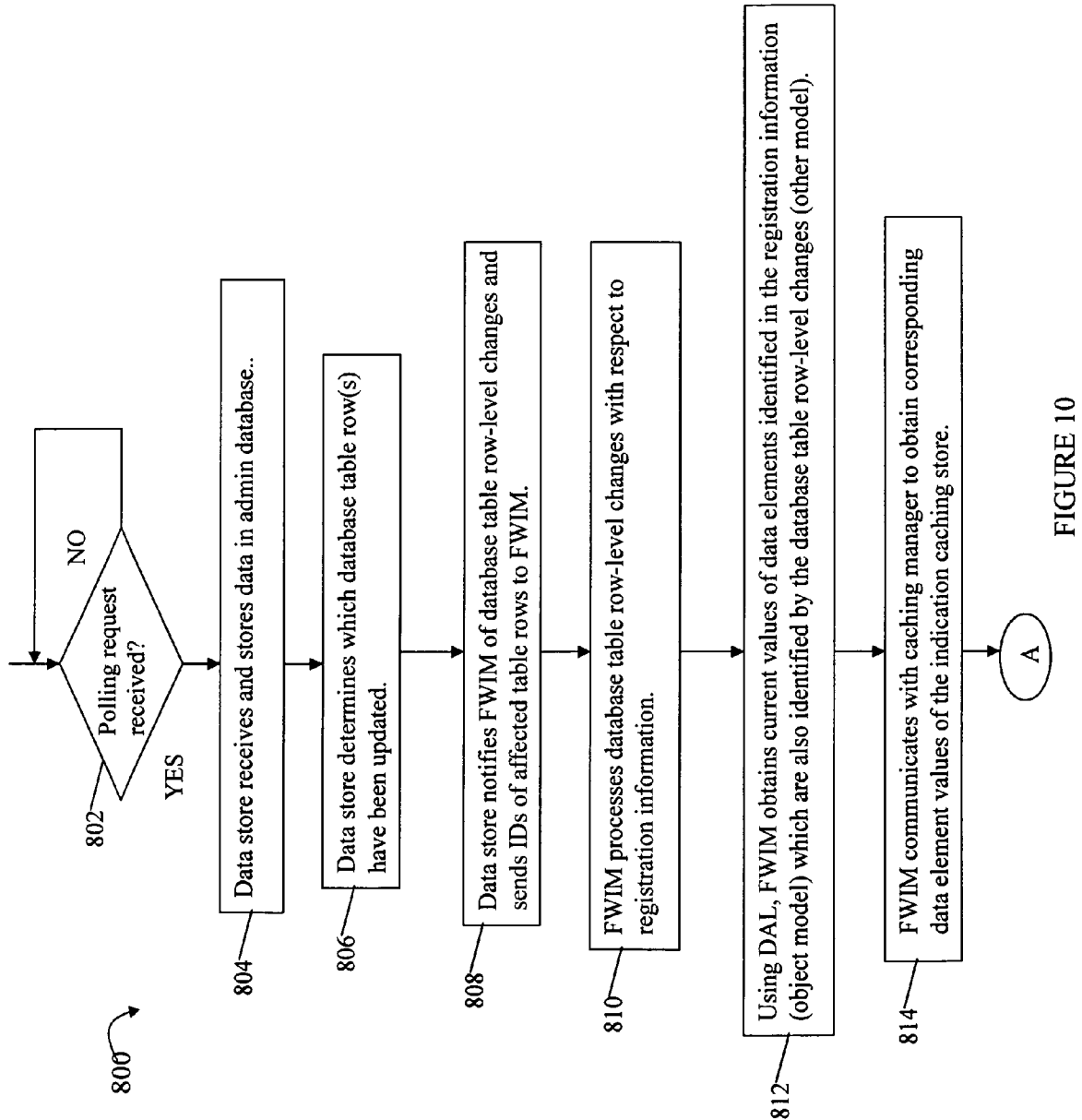
Figure 11:
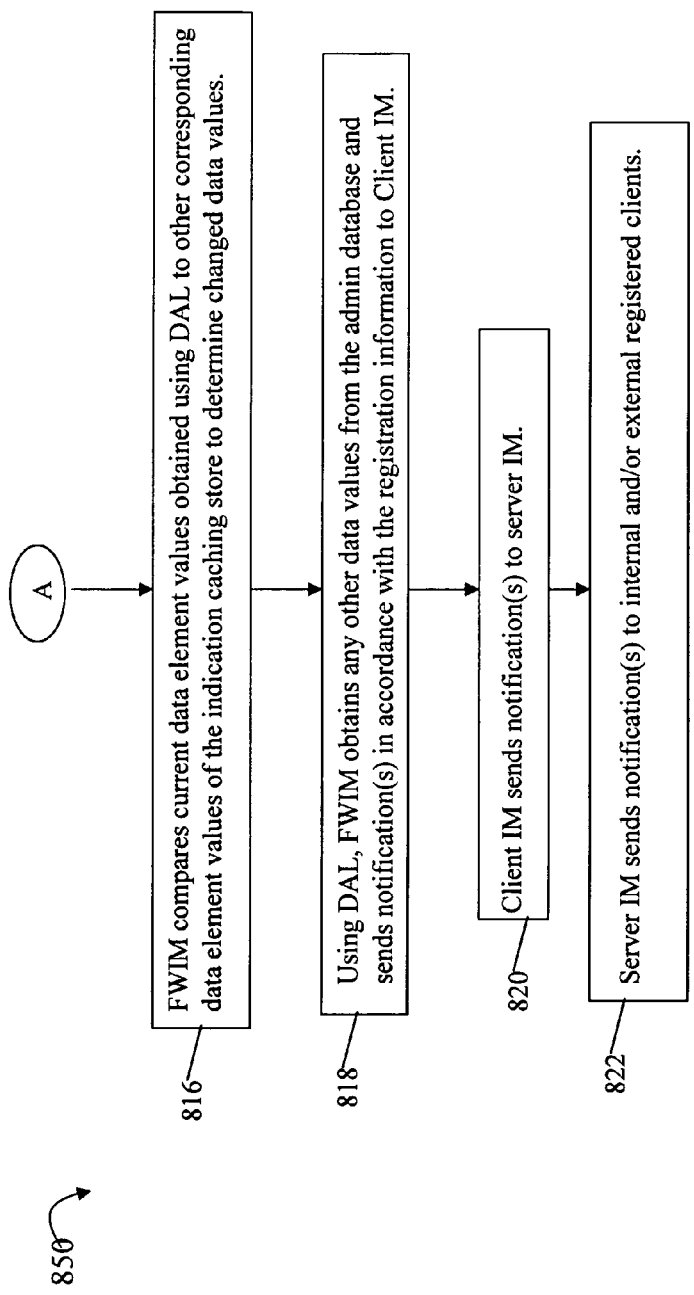

What will now be described in connection with FIGS. 9, 10 and 11 are flowcharts of processing steps summarizing processing described above.

Referring to FIG. 9, shown is a flowchart 700 of processing steps that may be performed in connection with indication registration processing in an embodiment in accordance with techniques herein. At step 702, the client registers with the server IM. The client may be an internal or external client with respect to the data storage system. At step 704, the server IM processes the client registration and communicates with the client IM to register the server IM as a subscriber of the client IM. In step 706, the client IM registers with the FWIM. The foregoing processing of steps 702, 704 and 706 may represent steps of registration processing in accordance with a subscription hierarchy including IMs as described above. The subscription and other registration information of the initial client in step 702 may be propagated to the FWIM for processing in step 710. In step 712, the FWIM communicates with the DAL to obtain values for the registered data elements. At step 714, DAL maps the registered data elements of the client object model to corresponding data elements in the database data model. In step 716, DAL retrieves values from the admin database and returns the values to the FWIM. In step 718, the FWIM communicates with the caching manager to store values of the registered data elements to the indication caching store.

With reference to FIGS. 10 and 11, shown are flowcharts of processing steps that may be performed in connection with indication notification processing in an embodiment in accordance with techniques herein. At step 802, a determination is made as to whether a polling request has been received. If not, processing waits at step 802 until step 802 evaluates to yes. At step 804, the data store receives and stores data in the admin database in accordance with the database model. At step 806, the data store determines which database table row(s) have been updated. In step 808, the data store notifies the FWIM of the database table row-level changes and sends IDs of the affected table rows. In step 810, the FWIM processes the row-level changes with respect to the registration information (e.g., registered data elements of the client object model). At step 812, using DAL, the FWIM obtains current values of registered data elements of the client object model which are also identified by the database table row-level changes. At step 814, the FWIM communicates with the caching manager to obtain previous values of registered data elements of the client object model which are also identified by the database table row-level from the indication caching store. At step 816, the FWIM compares the current values obtained in step 812 to corresponding previous values obtained in step 814 to determine any changed data values. In step 818, using DAL, the FWIM obtains any other current data values from the admin database needed to construct one or more notifications and then sends the notifications in accordance with the registration information to the client IM. In step 820, the client IM sends one or more notifications to the server IM. In step 822, the server IM sends one or more notifications to registered internal and/or external clients.

It should be noted that while the techniques described herein are illustrated with respect to a particular system, a data storage system such as a data storage array, the techniques herein may more generally be used in connection with any type of suitable system. Furthermore, particulars of the exemplary system described herein are for purposes of illustration and should not be construed as a limitation. For example, described above is an embodiment in which the data store provides notification to the FWIM of database table row-level changes. Another embodiment in accordance with techniques herein may provide the FWIM with a different granularity of change information. For example, the FWIM may be provided with information indicating which particular one or more entries of the row have been potentially changed by the insert, delete and/or update operation. Furthermore, an embodiment may provide the FWIM with information as to which one or more entries have had data value changes or differences. In such an embodiment, processing to determine data values changes or differences may be performed by a component other than the FWIM as described herein. The foregoing are some exemplary variations of embodiments described herein that may be included in other embodiments also in accordance with the generally applicable techniques.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing indication management comprising:
    receiving registration criteria including information identifying a first set of one or more data elements of a first data model about which a subscriber is registered to receive notifications;
    performing one or more operations to a second set of one or more data elements stored in one or more tables of a data store in accordance with a second data model, each of said one or more operations being an operation to modify, create or delete a data element in a row of a table of the data store, wherein the data store is updated in response to an occurrence of a fixed polling interval;
    responsive to performing said one or more operations to said second set of one or more data elements stored in the one or more tables of the data store, providing one or more data store change notifications, wherein each of said one or more data store change notifications identifies a row of a table in the data store that includes a data element to which one of said one or more operations is performed;
    responsive to said data store change notifications, determining which data elements of the first data model are dependent on data elements included in one or more rows denoted by said one or more data store change notifications, said determining including mapping said second set of one or more data elements in accordance with the second data model to a third set of one or more data elements in accordance with the first data model;
    determining, using said first set and said third set, a first portion of said third set which is identified in the first set; and
    performing first processing in accordance with said registration criteria and said first portion of said third set to determine notifications for a subscriber regarding data elements of the first set.

2. The method of claim 1, wherein data elements in said third set are dependent upon data elements in said second set.

3. The method of claim 1, further comprising:
    obtaining, from the data store, one or more current values for the first portion of data elements, said first portion including only data elements of the third set identified in the first set; and
    determining which of said one or more current values for the first portion of data elements have changed with respect to one or more previous values for the first portion of data elements.

4. The method of claim 3, wherein the one or more current values are updated values for the first portion of data elements as a result of performing said one or more data operations.

5. The method of claim 1, wherein said one or more data store change notification are provided to a first indication manager that performs said determining a first portion and sends one or more notifications to a subscriber in accordance with said first processing.

6. The method of claim 1, wherein said first data model is an object model including a plurality of objects and, for each of said plurality of objects, one or more attributes, and wherein said first set of one or more data elements identifies at least one of the plurality of objects or at least one attribute of one of said plurality of objects.

7. The method of claim 6, wherein said first set identifies a first object and said registration criteria indicates to provide notification regarding a change to one or more attributes of the object.

8. The method of claim 1, wherein said first subscriber is a first indication manager, a second indication manager subscribes to said first indication manager, and the first indication manager sends a set of one or more other notifications to said second indication manager regarding said set of one or more notifications.

9. The method of claim 8, wherein any of the first indication manager and the second indication manager sends a notification to a client.

10. The method of claim 6, wherein the registration criteria includes providing notification regarding any of deletion of an object, creation of an object, modification to an attribute of an object, and modification to any object of a class.

11. The method of claim 1, wherein a first data element in the first data model is determined using a plurality of data elements from the second data model.

12. The method of claim 11, wherein the first data element is an object having a plurality of attributes, a first of the plurality of attributes being determined using one or more data elements from the second model.

13. A system comprising:
    a framework indication manager that receives registration criteria including information identifying a first set of one or more data elements of a first data model about which a subscriber is registered to receive notifications;
    a client indication manager that receives notifications regarding data element changes from the framework indication manager;
    a data abstraction layer performing mapping operations between data elements of the first data model and a second data model, wherein one or more data elements of the first data model are dependent upon one or more data elements in the second data model;

a plurality of drivers providing, in response to a polling request at a first point in time, a second set of data elements;

a data store that stores the second set of data elements in accordance with the second data model and notifies the framework indication manager when an operation is performed to update one or more data elements of the data store;

an update manager that generates the polling request; and an indication caching store that stores a set of values only for data elements identified in said registration criteria, said set of values being values obtained at a second point in time prior to said first point in time, wherein the framework indication manager uses the set of values to determine whether any changes have been made to said first set since said second point in time, and wherein the data store is updated in response to an occurrence of a fixed polling interval causing generation of the polling request.

14. The system of claim 13, wherein said second point in time corresponds to when said framework indication manager performs registration processing in connection with said registration criteria.

15. The system of claim 13, wherein the operation to update the data store includes any of modifying an existing object in the second data model, creating a new object in the second data model, deleting an object in the second data model, and updating an attribute of an object in the second data model.

16. The system of claim 13, wherein another polling request is generated by the update manager in response to an occurrence of a trigger event that is any of an occurrence of a predetermined time interval, and when a client initiates an operation causing an update to one or more data elements of the first data model.

17. The system of claim 13, wherein the framework indication manager only sends a first notification regarding a first data element to the client indication manager if the first set identifies that a subscriber is registered to receive notifications regarding the first data element.

18. A non-transitory computer readable medium comprising code stored thereon for performing indication management in a data storage system, the non-transitory computer readable medium comprising code stored thereon which, when executed, performed a method comprising:

receiving registration criteria including information identifying a first set of one or more data elements of a first data model about which a subscriber is registered to receive notifications regarding entities in the data storage system;

receiving, from a plurality of drivers, state information describing a state of one or more entities in the data storage system;

storing, in a data store, the state information in accordance with a second data model, wherein said storing includes performing one or more operations to a second set of one or more data elements included in the state information stored in one or more tables of the data store in accordance with the second data model, each of said one or more operations being an operation to modify, create or delete a data element in a row of a table of the data store;

responsive to performing said one or more operations to said second set of one or more data elements stored in the one or more tables of the data store, providing one or more data store change notifications, wherein each of said one or more data store change notifications identifies a row of a table in the data store that includes a data element to which one of said one or more operations is performed, wherein the data store is updated in response to an occurrence of a fixed polling interval;

responsive to said data store change notifications, determining which data elements of the first data model are dependent on data elements included in one or more rows denoted by said one or more data store change notifications, said determining including mapping said second set of one or more data elements in accordance with the second data model to a third set of one or more data elements which are in accordance with the first data model and are dependent on said second set;

determining, using said first set and said third set, a portion of said third set which is identified in said first set; and performing first processing in accordance with said registration criteria and said portion of the third set to determine notifications for a subscriber regarding data elements of the first set, wherein said first processing includes identifying data elements of the portion having a current set of values which are different from previously stored values for the identified data elements.

19. The non-transitory computer readable medium of claim 18, wherein said first data model is an object model including a plurality of objects and, for each of said plurality of objects, one or more attributes, and wherein said first set of one or more data elements identifies at least one of the plurality of objects or at least one attribute of one of said plurality of objects.

* * * * *